Figure 1:
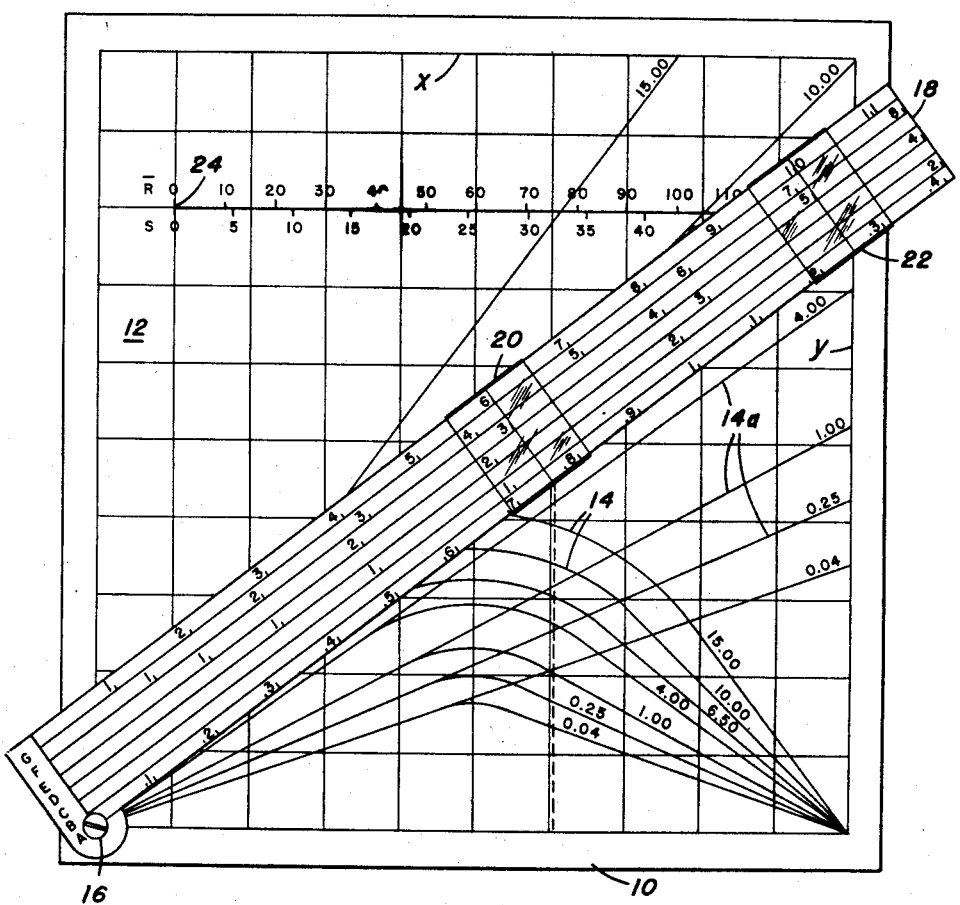

Feb. 9, 1960  J. A. GREENWOOD  2,924,379
GRAPHICAL INSTRUMENT FOR VARIABLES ACCEPTANCE SAMPLING
Filed Dec. 14, 1955  2 Sheets-Sheet 1

INVENTOR
JOSEPH A. GREENWOOD
BY
ATTORNEYS

United States Patent Office 2,924,379
Patented Feb. 9, 1960

2,924,379

GRAPHICAL INSTRUMENT FOR VARIABLES ACCEPTANCE SAMPLING

Joseph A. Greenwood, Falls Church, Va.

Application December 14, 1955, Serial No. 553,165

1 Claim. (Cl. 235—61)

(Granted under Title 35, U.S. Code (1952), sec. 266)

The invention described herein may be manufactured and used by or for the Government of the United States of America for governmental purposes without the payment of any royalties thereon or therefor.

The present invention relates to a variables sampling aid and more particularly to a variables sampling aid comprising a chart on which there is a distribution curve and an arm pivotally mounted on the chart.

Heretofore, sampling inspection has primarily been by the go-no-go method. To illustrate this by a simple example, assume that it is desired to inspect a lot of metal spheres whose nominal size is required to be 1.00 inch, and whose upper and lower limits are 1.03 inches and .98 inch, respectively. A sample of a given number of items would be selected at random from the lot, and the individual spheres would be tested by means of a go-no-go gage. This testing would tell how many spheres of the sample would lie within the range specified. Depending upon the quality level desired, the lot being tested would be approved if, say, 95 percent of these spheres tested fell within the range as determined by the go-no-go gage.

The newer and more scientific method of sampling inspection is known as sampling inspection by variables, and the principles of this method are set forth in "Sampling Inspection by Variables" by Bowker and Goode (Library of Congress, catalogue card No.: 51–12589). In brief, this method requires that the items of the selected sample be measured; that is to say, as distinguished from the above application of a go-no-go gage, the spheres in the variables sampling method would be actually measured individually. Thereafter, certain computing operations, more fully set forth below, would be performed in order to determine if the particular lot under inspection should be accepted or rejected.

Prior to the present invention the operations performed after the measurements have been made under the variables sampling system have been tedious, complicated, and time consuming. It is therefore an object of the present invention to provide a mechanical aid whereby many of the necessary operations may be mechanically performed.

Another object is to provide an aid which may be used rapidly and efficiently by persons possessing no particular mathematical or statistical training.

A further object of the invention is the provision of a mechanical aid the manipulation of which may be rapidly learned.

Figure 2:
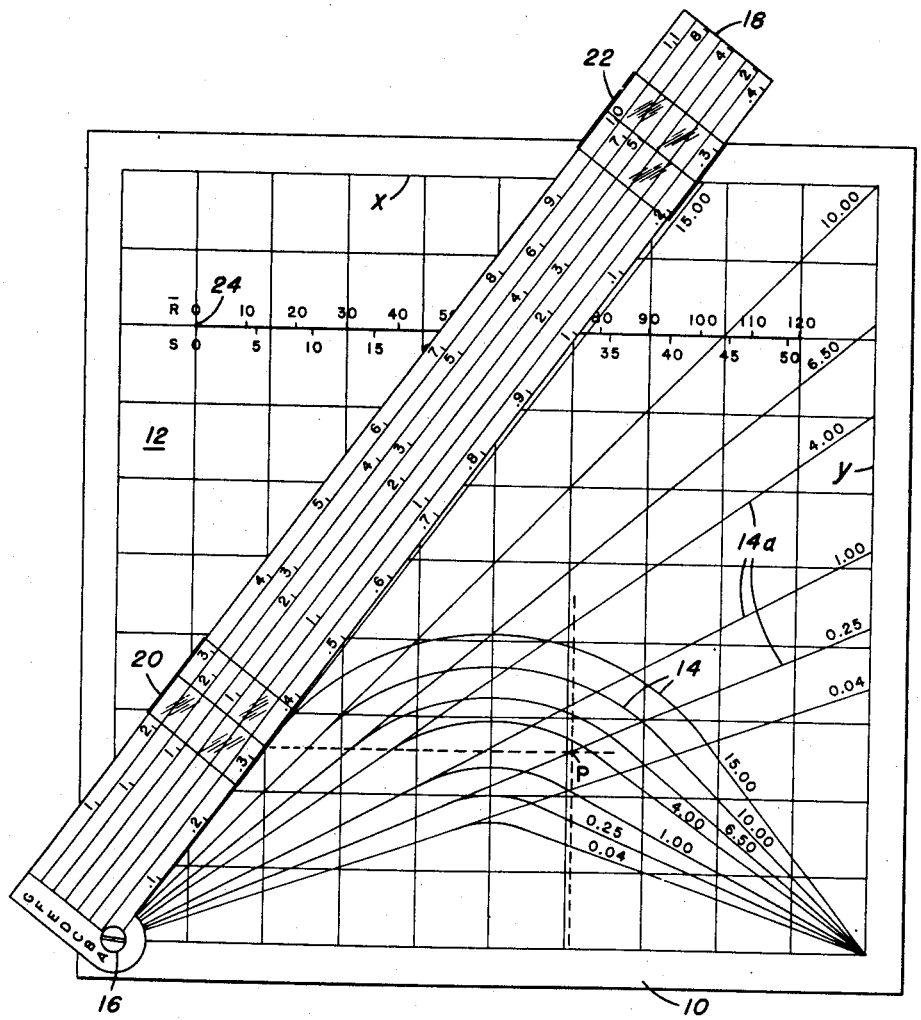

Other objects and many of the attendant advantages of this invention will be readily appreciated as the same becomes better understood by reference to the following detailed description when considered in connection with the accompanying drawings wherein:

Fig. 1 represents a view of the invention set in the first position of operation and Fig. 2 represents the invention set for the second position of the operation.

Referring now to the drawings, wherein like reference characters designate like or corresponding parts throughout the several views, there is shown in Fig. 1 a board 10 having mounted thereon a square grid 12, the right hand edge of which is designated $y$ and the top edge $x$. On the grid 12 are two series of curves, 14 and 14$a$, each of which serves to delineate acceptance and rejection areas, the curves 14 being used when inspection embraces an upper and a lower limit and curves 14$a$ being used when the particular inspection embraces only one limit. The curves 14 and 14$a$ are obtained from distribution theories, which are briefly and simply explained below, and are defined as acceptance region curves.

Each curve of the series of curves 14 or 14$a$ is for a separate "Acceptable Quality Level." Acceptable Quality Level (AQL) is any nominal value, expressed in terms of percent, representing the number of defective items which can be present in the sample taken and still have the sample accepted. For example, if the AQL is 4%, then 4% of the items in the lot sampled can be defective and the lot will still be considered satisfactory. Thus, the AQL sets the rigidity of the sampling and the lower the AQL, then the closer the inspection will be. The sampling inspection plan disclosed herein has an inherent accuracy of approximately 95%, which accuracy the operator has no control over. Therefore, once the AQL level has been set, then the sampling plan will accept approximately 95% of all the lots of that AQL percent defective (4% in our example).

The right hand edge of grid 12 is designated $y$, and the top edge $x$.

Attached to the board 10 by suitable pivotal means 16 is a scale arm 18 having thereon a number of linear scales identified as A, B, C, D, E, F, and G reading from the bottom upward. There are three important characteristics of scale arm 18: its lower edge is pivoted at the lower left hand corner of the grid 12, the bottom scale has a unit length equal to the side of the grid, and each scale from A to G is $\sqrt{2}$ times the preceding scale. Here are two indicators or hair line cursors on the scale arm 18, these indicators being designated 20 and 22 respectively.

Near the top of grid 12 is a scale 24 of S plotted against $\bar{R}$, S being the standard deviation and $\bar{R}$ the average range.

The operation of the present invention is simple and will now be explained by way of an example. Assume that it is desired to inspect spheres of nominal diameter of 1.00 inch and having an upper limit of 1.03 inches and a lower limit of .98 inch. A lot of five thousand spheres is to be inspected. An acceptable quality level of 4.00 percent is required. From certain prepared tables (such as Table III of Military Standard 105A, September 11, 1950, Sampling Procedures and Tables for Inspection by Attributes) it is determined that a sample of sixty spheres is to be selected at random from the lot of five thousand. The sample of sixty spheres is divided into twelve groups of five, and each sphere is then measured to determine its diameter. The simple arithmetic average diameter is obtained by adding all the diameters and dividing the sum by sixty, the number of items. This is designated $\bar{X}$, and is assumed to be 1.01 inches in the example. Next the average range, $\bar{R}$, is determined. Range may be defined as the difference between the largest and smallest measurements in a group: thus, the range of each sub-sample of five spheres is obtained by subtracting the diameter of the smallest sphere in the sub-sample from the diameter of the largest sphere in the sub-sample. The simple arithmetic average of the twelve ranges is obtained by the same steps as stated above in connection with $\bar{X}$. The average range $\bar{R}$ is assumed to be, in the example, .03 inch. From the scale 24 of $\bar{R}$ vs S at the top of chart 12, S is seen to be .013. Next, (U—L) is obtained by subtracting the lower limit, .98 inch, from the upper limit 1.03 inches, to obtain .05 inch and ($\bar{X}$—L) is obtained by subtracting the lower limit .98 inch from $\bar{X}$, 1.01 inches, to obtain .03. The following values have been obtained:

$\bar{X} = 1.01$
$\bar{R} = .03$
$S = .013$
$U—L = .05$
$\bar{X}—L = .03$

With the scale arm 18 in the horizontal position, a scale is selected on which the value of U—L, .05, appears to the right of line $y$ (in this illustration, scale E), indicator 22 is set on the numeral "5" of that scale and the scale is rotated until the lower end of the hairline lies on line $y$. $\bar{X}$—L, .03 or "3" is located on the same scale of scale arm 18, indicator 20 is moved to that numeral, and a first check mark is made on the chart at the bottom of the hairline of indicator 20. This position is shown in Fig. 1. Thereafter, the scale arm 18 is rotated with the indicator 22 in the same position on scale arm 18 until the bottom of the hairline of indicator 22 lies on line $x$. The hairline of indicator 20 is then moved to the value of S, .013, or "1.3," on scale E, and a second check mark is made on the chart at the bottom of the hairline of indicator 20. This is the position shown in Fig. 2. A vertical line is drawn through the first check mark, and a horizontal line through the second, and the point of intersection P obtained. Since point P lies under 4.00 curve, it is concluded that the lot falls within the AQL of 4.00% established. Had the AQL been 1.00%, it is apparent that the lot would be rejected, since the point P is above the 1.00 AQL curve.

In certain inspections, only one limit is given, either the upper or lower. Where a lower limit L is given, S and $\bar{X}$—L are found as before, and then any number $r$ which is greater than or equal to both S and $\bar{X}$—L is selected arbitrarily. For instance, using the corresponding values of the above example, $r$ could be chosen to be .03 or even .04. Then $r$ replaces U—L in the procedure described above, and the succeeding steps in the process are identical to it. The lot is then accepted if intersection point P lies under the appropriate AQL line 14a. Where an upper limit V is given, it is only necessary to replace $\bar{X}$—L with U—$\bar{X}$, and proceed as before.

Definitions and symbols

Lot.—The term "lot" means "inspection lot," i.e., a collection of units of product submitted by a supplier for purchaser inspection, and subsequent acceptance or rejection as a whole.

Percent defective.—The percent defective for a quality characteristic of a given lot of product is the number of units of product defective for that characteristic divided by the total number of units of product, the quotient multiplied by 100.

$\bar{x}$ Sample mean. Arithmetic mean of sample measurements from a single lot.

R Range of a group of measurements. Largest value minus smallest value.

$\bar{R}$ R-bar. Arithmetic mean of several ranges.

S Sample standard deviation. If N is sample size and $X_1, X_2 \ldots X_N$ are the sample values, then $$S^2 = [(X_1^2 + X_2^2 + \ldots + X_N^2) - N(\bar{X})^2]/(N-1)$$

U Upper specification limit.
L Lower specification limit.
AQL Acceptable quality level. A lot percent defective which is acceptable to the buyer.
Sample A sample comprises a specified number of units of product drawn at random from a lot; i.e., the units are selected without regard to their quality.

Obviously many modifications and variations of the present invention are possible in the light of the above teachings. It is therefore to be understood that within the scope of the appended claims the invention may be practiced otherwise than as specifically described.

What is claimed is:

A graphical instrument for variables acceptance sampling comprising a square grid having a plurality of acceptance quality level curves thereon extending from one corner thereof, a comparison scale parallel with one edge of the grid for comparing the average range and the standard deviation of the sample being taken, a scale arm, a pivot for pivotally attaching said scale arm to said corner of the grid, said scale arm being of a length equal at least to the diagonal of the grid and having a plurality of linear scales thereon including a first scale of unit length equal to one side of the grid extending radially from said pivot, a second scale parallel to said first scale of unit length equal to one-half the diagonal of said grid, each succeeding scale on said scale arm being parallel to the first two scales and of a unit length equal to $\sqrt{2}$ times the preceding scale, and first and second movable hair-line cursors mounted on said scale arm.

References Cited in the file of this patent

UNITED STATES PATENTS

| | | |
|---|---|---|
| 748,566 | Pierce | Dec. 29, 1903 |
| 811,625 | Edmonds | Feb. 6, 1906 |
| 1,048,044 | Craig | Dec. 24, 1912 |
| 1,290,000 | Lahm | Dec. 31, 1918 |
| 1,402,803 | Smith | Jan. 10, 1922 |
| 2,301,068 | Morgan | Nov. 3, 1942 |

FOREIGN PATENTS

| | | |
|---|---|---|
| 320,190 | Germany | Apr. 12, 1920 |
| 862,066 | Germany | Jan. 8, 1953 |
| 755 | Great Britain | Jan. 18, 1886 |
| 298,553 | Switzerland | July 16, 1954 |